United States Patent [19]

Elsing

[11] 4,391,543
[45] Jul. 5, 1983

[54] QUICK DISCONNECT PACK

[75] Inventor: John W. Elsing, Edina, Minn.

[73] Assignee: Magnetic Peripherals Inc., Minneapolis, Minn.

[21] Appl. No.: 224,362

[22] Filed: Jan. 12, 1981

[51] Int. Cl.³ .............................................. F16B 1/00
[52] U.S. Cl. ....................................... 403/24; 403/322; 403/325; 360/97; 206/444; 346/137
[58] Field of Search ........................ 24/211 N, 211 R; 411/348; 403/316, 317, 322, 325, 24; 360/97, 98; 206/444; 346/137

[56] References Cited

U.S. PATENT DOCUMENTS

| | | | |
|---|---|---|---|
| 3,465,875 | 9/1969 | McKelvey, Jr. | 220/327 X |
| 3,487,390 | 12/1969 | Klinger et al. | 360/98 |
| 3,635,608 | 1/1972 | Crouch et al. | 206/444 |
| 3,762,543 | 10/1973 | Wirth | 206/444 |
| 4,068,271 | 1/1978 | Kok | 360/97 |
| 4,078,246 | 3/1978 | Berthoux et al. | 346/137 X |

FOREIGN PATENT DOCUMENTS 520462  8/1976  U.S.S.R. ............................. 403/316

*Primary Examiner*—Andrew V. Kundrat
*Attorney, Agent, or Firm*—Joseph A. Genovese; Edward P. Heller, III

[57] ABSTRACT

A means for mounting an exchangable disk pack. The disk pack's hub includes an open ended stub with two retractable steel balls mounted adjacent the open end. The disk drive's spindle has a coaxial recess for receiving the stub. The recess has an interior annular groove adapted for registration with the balls. The stub is inserted into the recess when mounting the disk pack. When the hub and spindle are in abutment, the balls are positioned just anterior to the annular groove. The stub is mounted on a diaphragm mounted on the hub. Depression of the diaphragm moves the balls into registration with the annular groove. The balls then move from their retracted condition and into the groove under pressure from a push rod moveably mounted in the spindle recess. After the balls have been pushed aside, the push rod pops up between them and prevents their retraction from the annular groove. The lodging of the balls in the annular groove prevents the stub from being withdrawn from the recess. Disconnection is provided by withdrawing the push rod from between the balls. This allows the balls to retract from the annular groove and the stub to be withdrawn from the spindle's recess.

15 Claims, 6 Drawing Figures

QUICK DISCONNECT PACK

BACKGROUND OF THE INVENTION

1. Field of the Invention

The invention relates generally to the field of data processing and more particularly to the interchangable disk pack mounting means.

2. Brief Description of the Prior Art

The most common method of mounting interchangable disk packs is to provide on the disk pack's hub a threaded stub which is screwed into a corresponding recess in the drive spindle.

Another method described in U.S. Pat. No. 3,635,608, has magnetic coupling between the hub and spindle which is disengageable by means of pivoting upwards a handle mounted on the case.

Another method described in U.S. Pat. No. 4,068,271, to Kok, comprises a disk cartridge whose hub has a rather broad bore designed to fit about a similarly broad spindle. The lowering of the disk drive's lid forces downward a pressure member mounted on the spindle. The pressure member causes lever arms to lift the upper half of the cartridge's case from the lower half, exposing apertures through which the disk drive's heads may be inserted. The pressure member also forces clamping members to bend outwards and frictionally engage the hub.

These devices have had difficulties ranging from clumsiness and slowness in handling, proneness for misalignment and undue complexity and expensiveness in design. It is desirable to provide a mounting means which at once is simple to use and which, additionally, provides accurate alignment.

SUMMARY OF THE INVENTION

The present invention provides a quick and easily operated removable disk pack mounting means. The mounting means connects and locks the pack to the spindle in one brief step, namely: pushing down with a small amount of force on the top of the pack. The pack is released by pressing a lever mounted on the disk drive.

In more detail, the mounting means comprises the following: one or more disks are mounted on a hub having a central bore. Mounted on the hub is a restoring force means deflectable toward said bore. Said restoring force means carries a stub which extends through the bore. Mounted on the end of the stub are retractable balls. The end of the hub in which the balls are mounted is hollow and open. The stub is insertable into a corresponding recess in the disk drive's spindle. Mounted interior to the recess is an annular groove for registration with the balls. The walls of the recess are narrow and force the balls to retract upon insertion of the stub therein. When the hub abuts against the spindle, the balls ride just above the annular groove in the spindle recess. Pushing on the restoring force means causes the stub to move downwards and the balls to register within the annular groove. A spring loaded push rod movably mounted in the spindle and extending from below into the recess is biased against the balls. When the balls register with the annular groove, the push rod pushes the balls aside and into the groove and then pops up between them preventing their retraction from the annular groove. The lodging of the balls in the annular groove prevents the stub from moving back out of the recess. This also causes the restoring force means to remain deflected downwards. The deflected means provides a force to hold the hub against the spindle. This force is strong enough to prevent the pack from slipping on the spindle during rotation thereof.

Disconnection is provided by means for withdrawing the push rod from between the balls. This allows the balls to retract inwards out of the annular groove. The retraction of the balls allows the stub to move up the relatively narrow recess and for the hub (and disk pack) to be removed from the spindle.

DESCRIPTION OF THE PREFERRED EMBODIMENT

Figure 1:
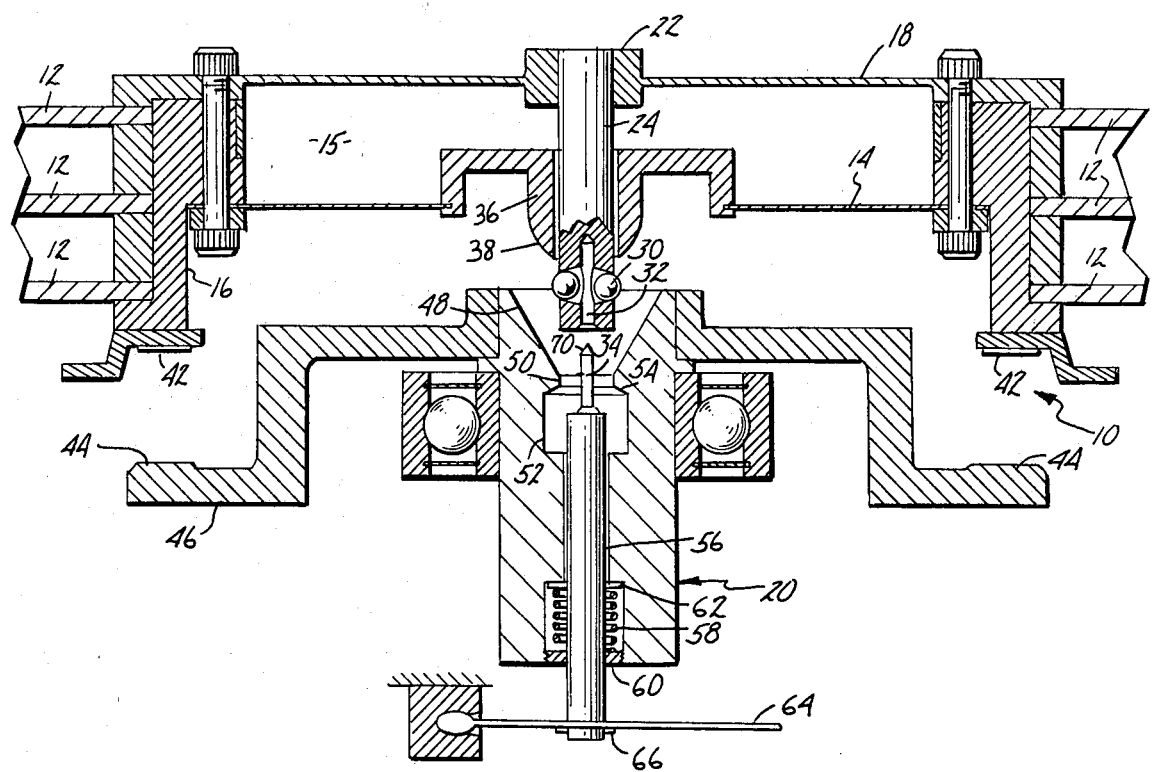
FIG. 1 shows a cross sectional view of a disk pack and a disk drive spindle particularly illustrating the connecting mechanism of the present invention.

FIG. 1 illustrates a partial cross sectional view of a disk pack 10 and a disk drive spindle 20 according to the present invention. Parts of these two elements not essential to an understanding of the present invention have been omitted from the drawings for the purposes of clarity.

Referring first to the disk pack 10, magnetizable disks 12 are mounted on hub 16. When mounted on the disk drive spindle, the drive's heads (not shown) extend inwards towards the hub 16 to both write and read information on magnetizable disks 12, as is known.

Mounted on hub 16 of diaphragm 18 which is composed of a thin sheet of metal, such as aluminum, which may be deflected by a small amount of force at the center thereof 22. When such a force is exerted at point 22 from the top of a disk pack 10, diaphragm 18 deflects downwards toward a locating diaphragm 14. Locating diaphragm 14 spans the central bore 15 of hub 16.

Mounted on diaphragm 18 is a stub 24. Stub 24 extends through the central bore 26 in alignment ball 36 (discussed infra) of locating diaphragm 14. Stub 24 extends some distance past locating diaphragm 14 to terminate in a hollow portion 32 having an open end. Mounted in the hollow portion 32 are steel balls 30. Each ball is loosely mounted in the walls of stub 24. They are free to move laterally between a retracted position shown in FIG. 2 and an extended position shown in FIG. 3, but are captivated within the stub and limited in a predetermined extrusion.

Mounted concentrically on locating diaphragm 14 is alignment ball 36. The alignment ball 36 has a bearing surface 38, which is preferably hemispherical in contour.

Also mounted on hub 16 are three pads 42 which are designed to rest on a lateral flange 46 mounted on spindle 20.

Spindle 20, which is connected to the disk drive's motor (not shown) by means (not shown) for rotation thereof has at one end thereof a conical bearing surface 48 which acts as a corresponding alignment means to the alignment ball 36 mounted on diaphragm 14. The abutment of the hemispherical bearing surface 38 against the conical bearing surface 48 of spindle 20 causes the hub 16 to be concentrically aligned with the longitudinal central axis of spindle 20, as may be seen in reference to FIG. 2. The hemisphere bottoms out on the conical bearing surface a short distance before the pads 42 bottom out on the spindle flange 46. The locating diaphragm 14 thus deflects, insuring that hub 16 is centered as the pack moves axially down onto the spindle 20.

Figure 2:
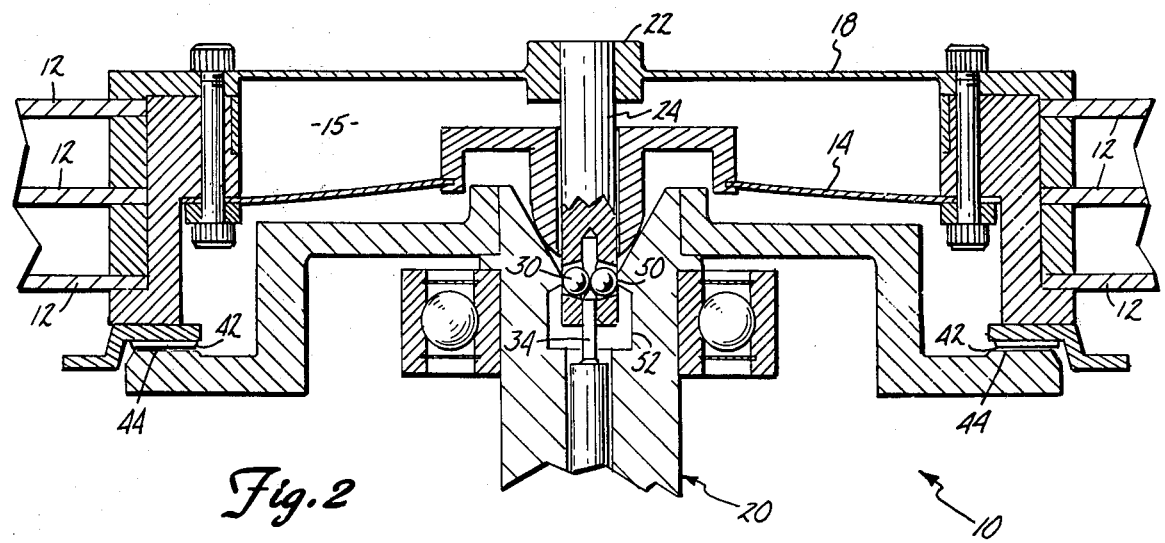
FIG. 2 shows a cross sectional view of the disk pack hub mounted on the spindle but not connected thereto.

At the apex of the conical bearing surface 48 is a narrow passageway 50, which is of a cross section slightly larger than the cross section of stub 24. The insertion of stub 24 into narrow passageway 50 causes the balls to be pushed inwards into the interior of stub 24 to their retracted position, as illustrated in FIG. 2.

Mounted in the interior of narrow passageway 50 is annular groove 52, which has a slightly larger cross section than narrow passageway 50. When the stub 24 is pressed inwards so that balls 30 align with annular groove 52, as illustrated in reference to FIG. 3, the balls 30 may move laterally outwards to their extended position by reason of the larger cross section of annular groove 52.

Figure 3:
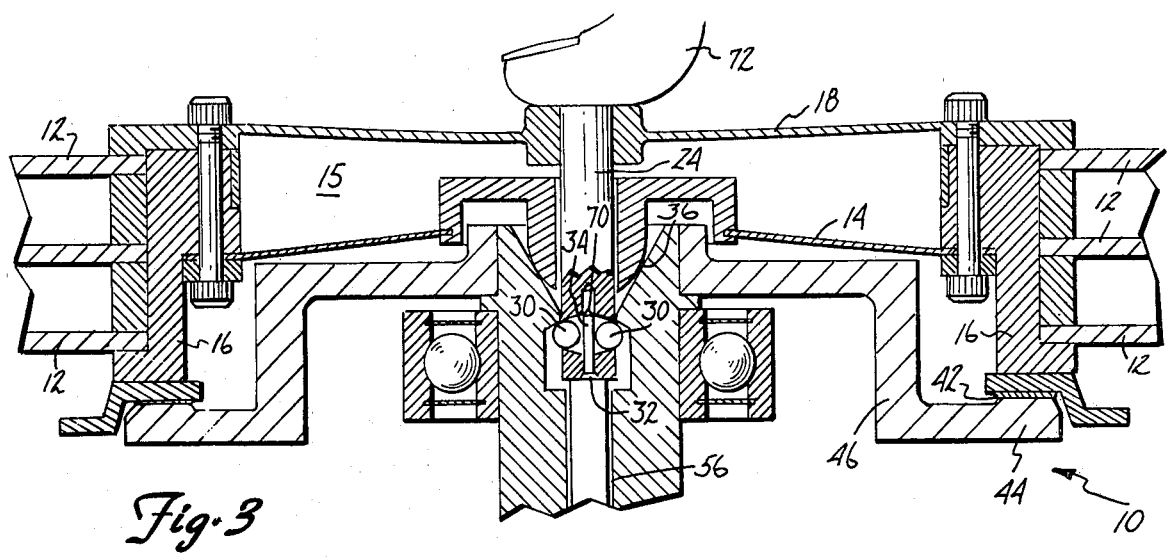
FIG. 3 shows a cross sectional view of the hub now connected to the spindle. A thumb pressing on the restoring force means on the top of the hub illustrates the manner in which the connection may be effected.

Annular groove 52 may have its top shoulder thereof 54 slightly inclined, as illustrated, for the purposes of imparting to balls 30, from a position shown in FIG. 3, an inwards biasing force when stub 24 is exerting an upwards force. This force comes from the stored energy in a deflected diaphragm 18, as will be more fully explained, infra. This inwards biasing force helps facilitate the movement of balls 30 inwards to their retracted position, as shown in FIG. 2, so that stub 24 may be withdrawn from passegeway 50.

A diaphragm is not the only means of providing a restoring force. Other means of accomplishing this might be by providing a cluster spring arrangement around the outside of stub 24, or by any other equivalent restoring force means to stub 24.

Also mounted in the interior of spindle 20 is push rod 34. Spindle 20 has a longitudinal coaxial shaft 56 through which push rod 34 extends. Push rod 34 in its nominal rest position (FIG. 1), extends beyond shaft 56, past annular groove 52 and into the narrow passageway 50. Push rod 34 has a biasing means 58 mounted in spindle 20 which biases push rod 34 in an outwards direction relative to spindle 20. The biasing means 58 may preferably be a spring captured between a base plate 60 mounted on spindle 20 and a retainer 62 mounted on push rod 34.

Mounted in a fixed relation to spindle 20 is pivotal lever 64 which when pivoted in a downwards direction catches on retainer 66 of push rod 34 to withdraw push rod 34 in a downwards direction.

The cross section of push rod 34 is broader than the gap between balls 30 in their retracted position, as illustrated in FIG. 2, but narrower than the gap between balls 30 in their extended position, as shown in FIG. 3. Thus when the stub 24 is inserted into spindle 20 and the balls are forced into their retracted position as shown in FIG. 2, the balls abut against the top end of push rod 34, as illustrated, and push the push rod 34 downwards a short distance. When thereafter the stub 24 is pushed further downwards in the passage 50 by an operator pressing on the top of diaphragm 18, the balls 30 reach the wider annular groove 52. There the push rod 34 forces them to move laterally into the groove 52, as shown in FIG. 3. The push rod then slides between (or pops up between) the balls 30, as shown in FIG. 3, under the urging of biasing means 58.

The top surface of push rod 34 preferably has inclined surfaces 70. When push rod 34 abuts against the balls 30 in their retracted position, the inclined surfaces 70 tend to translate the outwards biasing force from biasing means 58 into a lateral force on balls 30, which, likewise, tends to force them into the wider cross section of annular groove 52 when the balls 30 are registered therewith.

When the pads 42 are in contact with the lateral flange 46, the nominal rest position of the balls will be as shown in FIG. 2, just above annular groove 52 in passageway 50. The balls 30 will have pushed push rod 34 downwards from its initial position, as shown in FIG. 1, to the position as shown in FIG. 2. In the condition shown in FIG. 2, the disk pack 10 is not yet connected to spindle 20. Stub 24 may still be withdrawn from spindle 20 because balls 30 are in their retracted positions and will exert no inhibition to movement up narrow passageway 50. However, when a small amount of force is exerted on the top of diaphragm 18, as illustrated by thumb 72, diaphragm 18 deflects downwards a small distance, sufficient to bring balls 30 into alignment or registration with annular groove 52. Push rod 34 exerts a lateral force on balls 30 urging them outwards into their extended position as shown in FIG. 3. When the balls have moved into their extended position, as shown in FIG. 3, push rod 34 is free to spring between balls 30, as shown. At this point, balls 30 are not free to move inwards because of the blocking presence of push rod 34. They instead abut against the top shoulder 54 of the annular groove 52 and cannot be withdrawn up narrow passageway 50. Stub 24 is locked into position and, likewise, so is disk pack 10.

Diaphragm 18 remains slightly flexed when balls 30 are captured in annular groove 52. This flexure exerts a force upwards tending to pull balls 30 against the top shoulder 54 of annular groove 52. This force forcibly holds friction pads or stops 42 against corresponding friction surfaces 44 mounted on lateral flange 46 such that the rotational torque of the spindle 20 is translated to disk pack 10. Likewise, alignment ball 36 is held tightly against bearing surface 48 for accurately centering pack 10 on spindle 20.

The disk pack 10 is disconnected from spindle 20 by pressing lever 64 downwards. Lever 64 catches on retainer 66 and draws push rod 34 downwards until balls 30 are free to move inwards to their retracted position, as illustrated in FIG. 2. The inclined surfaces 54 urge the balls inward. When they have reached their full inward position, the force of diaphragm 18 upwards withdraws stub 24 into the position shown in FIG. 2. Balls 30 now cannot move laterally outwards due to the retaining action of the narrow passageway 50. The release of the lever 64 thus does not cause the relatching of the disk pack. The push rod moves upwards upon release and abuts against the retracted balls 30 but it cannot push them aside.

Lever 64 is for purposes of illustration only and is not necessarily meant to be the disconnect means employed. A push button arrangement or an electrical means (such as a solenoid) may be preferable.

Figure 4:
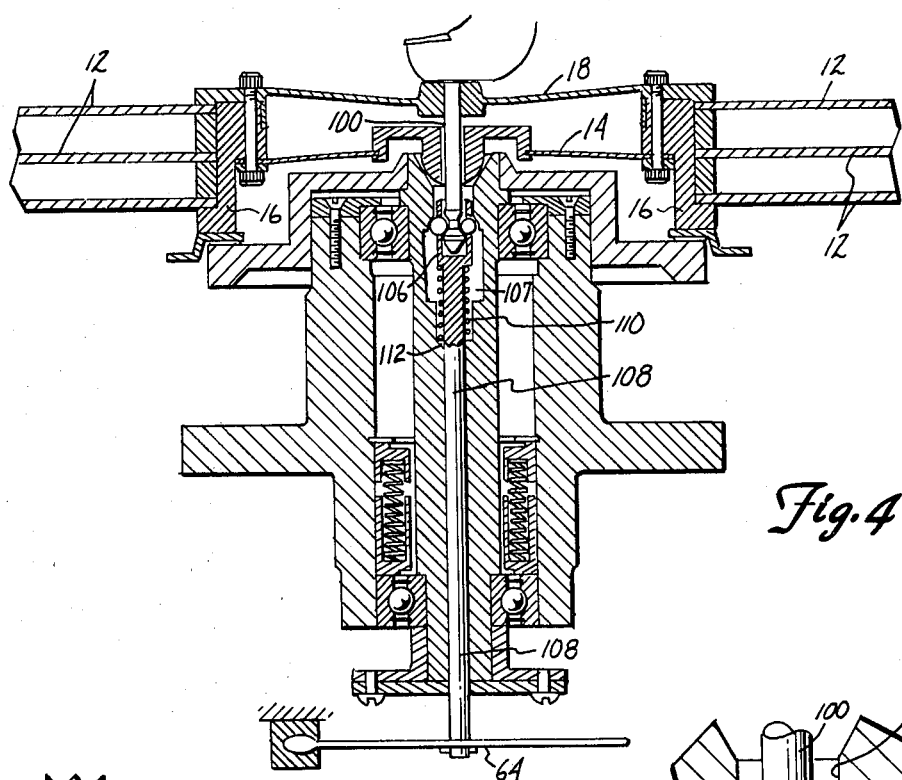
FIG. 4 shows a cross sectional view of an alternative embodiment.
Figure 5:
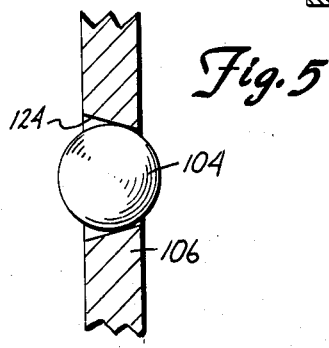
FIG. 5 shows an enlarged partial cross sectional view of a portion thereof.
Figure 6:
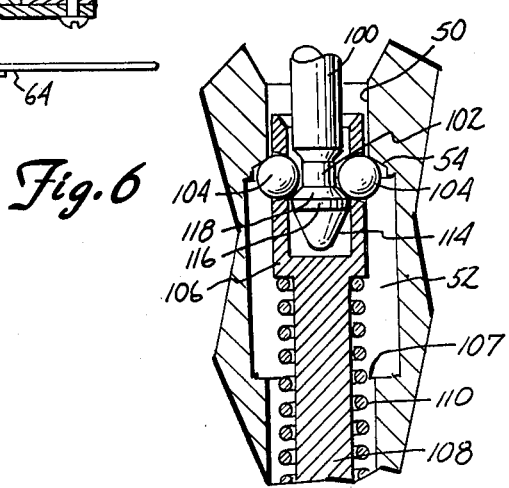
FIG. 6 shows an enlarged view of a slide and ball from FIG. 5.

FIGS. 4, 5 and 6 illustrate an alternative embodiment of the present invention whose essential features are unchanged in principle from the preferred embodiment. In this alternative embodiment, the stub 100 does not carry the steel balls 30, but instead has an annular groove 102 for registration with the steel balls 104 now mounted on a slide member 106 which is slidably mounted in spindle annular groove 52. The slide member 106 is partially mounted in an alignment passageway 107 and axially movable therein. The slide member may be withdrawn axially downwards therealong by action of a disconnect lever 64 on a shift 108 connected to the bottom of the slide member 106. Biasing means 110, which is a spring 110 captured between retaining wall 112 and slide member 106 about shaft 108, biases the slide member 106 upwards.

In operation, the depression of diaphragm 18 causes the stub 100 to abut against the top of balls 104 and force them downwards against the resistance of biasing means 110. The inclined surfaces 114 at the top of stub 100 force the balls outwards along the inclined surfaces 54 and into annular groove 52, gradually separating them. When the gap between balls 104 is the same as the cross section of stub 100 at point 116, the biasing means 110 forces the slide member 106 and balls 104 upwards, past the obstruction of the wide point of the stub 116. Movement of the slide upwards causes the balls 104 to ride inwards under action of inclined surfaces 54. The movement inwards causes the balls 104 to register with annular groove 102, as shown in the figures.

Release of pressure on the diaphragm 18 at this point causes the stub 100 to be urged upwards. The bottom portion of the stub annular groove 102 is an inclined surface 118. This surface 118 abuts against balls 104 which in turn abut against inclined surface 54. The direction of force from the abutment of these surfaces does not tend to force balls 104 outwards and downwards along inclined surface 54, but instead tends to maintain the balls 104 in registration with stub annular groove 102. Thus the balls remain registered with the stub's annular groove 102, and the stub 100 cannot be withdrawn up the narrow passageway 50.

The stub 100 is released, as in the preferred embodiment, by depressing lever 64 which withdraws slide member 106 downwards. The withdrawal of the slide member 106 downwards, causes the balls 104 to move outwards into the spindle's annular groove 52 until the gap between the balls 104 is wide enough to allow the wide portion 116 of stub 100 to pass between them; whereupon, the force of the deflected diaphragm 18 causes the stub 100 to pop upwards. Release of the disconnect lever 64 at this point does not relock the pack. The balls move back up inclined surface under urging of biasing means 110, but their inward movement is limited by the cone shaped holes 124 (FIG. 5) in slide member 106.

Those skilled in the art will appreciate that more than two steel balls may be conveniently used in both embodiments, although more than two are not essential.

The illustration and enumeration of the specific elements of the preferred and alternative embodiments are not by means of limitation of the present invention. Such modifications as may be deemed within the scope and spirit of the appended claims are understood to be within the ambit of the invention.

I claim:

1. Apparatus for connecting a disk pack to a disk drive comprising:
   a hub adaptable for mounting thereon one or more disks; said hub having a central axis;
   a stub axially mounted on said hub;
   a spindle mounted on said disk drive and having a central bore with an open end and a central axis; said central bore adapted to receive said stub;
   an annular groove disposed in said bore and having an upper shoulder;
   at least two recesses disposed in said stub, each having a lower shoulder;
   at least two balls movably disposed in relation to both said spindle and said stub and movable between two positions, a first position adapted to allow free movement of said stub into and out of said bore, and a second position adapted to capture said at least two balls between said upper and lower shoulders and prevent said stub from being withdrawn from said bore;
   first biasing means for biasing said balls into said second position after said stub has been inserted into said bore to a predetermined extent;
   locking means for locking said balls in said second position against a force tending to withdraw said stub from said bore;
   moving means for moving said balls into said first position to allow said stub to be withdrawn from said bore; and
   restoring force means mounted on said hub and connected to said stub for providing a force tending to withdraw said stub from spindle when said stub extends into said bore said predetermined extent.

2. The apparatus of claim 1 wherein said stub comprises an open ended hollow shaft;
   wherein said at least two balls are mounted on said stub in said at least two recesses and movable between a first position wherein said balls are substantially interior to said hollow shaft, and a second position wherein said balls extend a substantial distance exterior said hollow shaft;
   said biasing means comprises a narrow shaft axially movably mounted on said spindle in said bore and extending a distance sufficient to enter the open end of said stub and abut against said balls when said stub is inserted into said bore to said predetermined extent;
   said locking means comprises said narrow shaft having a cross section narrower than the gap between said at least two balls in their second position, and further comprising second biasing means for biasing said narrow shaft between said at least two balls after they have moved into their second position, the width of said narrow shaft between said balls acting to prevent movement of the balls back to their first position, thereby preventing the withdrawal of said stub from said bore; and
   said moving means comprises means for withdrawing said narrow shaft from between said balls, and further comprises third biasing means for biasing said balls from said second position to said first position by action of a force tending to withdraw said stub from said spindle.

3. The apparatus of claim 2 wherein said third biasing means comprises said upper shoulder being an inclined surface.

4. The apparatus of claim 2 wherein the abutting end of said narrow shaft has an inclined annular surface adapted to translate an outwards biasing force on said at least two balls into a lateral biasing force.

5. Apparatus for connecting a disk pack to a disk drive comprising:
- a hub adaptable for mounting thereon one or more disks; said hub having a central axis;
- a stub axially mounted on said hub;
- a spindle mounted on said disk drive and having a central bore with an open end and a central axis; said central bore adapted to receive said stub;
- an annular groove disposed in said bore and having an upper shoulder;
- an annular groove disposed in said stub, having a lower shoulder;
- at least two balls movably disposed in relation to both said spindle and said stub and movable between two positions, a first position adapted to allow free movement of said stub into and out of said bore, and a second position adapted to capture said at least two balls between said upper and lower shoulders and prevent said stub from being withdrawn from said bore;
- first biasing means for biasing said balls into said second position after said stub has been inserted into said bore to a predetermined extent;
- locking means for locking said balls in said second position against a force tending to withdraw said stub from said bore; and
- moving means for moving said balls into said first position to allow said stub to be withdrawn from said bore; and
- further including a slide member axially movably mounted on said spindle in said bore, said slide member having said at least two balls laterally movably mounted thereon;
- said slide member defining a central passageway adapted to receive said stub, second bias means for biasing said slide member axially outwards;
- said upper shoulder of said spindle annular groove being an inclined surface adapted to bias said at least two balls laterally inwards when said slide member biases said balls outwards against said inclined surface;
- said stub having a first cross section and said spindle annular groove having a second cross section such that the difference between the two is large enough to allow said at least two balls to move between them and thereby allow said stub a passageway to move between said at least two balls when they are positioned in said annular groove; the position of said balls allowing the passage of said stub comprising said first position;
- said slide biasing means and said upper shoulder inclined surface acting to force said at least two balls to move laterally inwards to register with said stub annular groove when said stub is inserted to said predetermined extent and its annular groove is in alignment with said upper shoulder, the registered position comprising said second position;
- the tendency of said upper shoulder's inclined surface to translate an outwards force on said at least two balls into an inwards lateral force comprising said locking means;
- said means for moving said balls from said second position to said first position comprising means for moving said slide axially inwards; and further comprising said lower shoulder having an inclined surface to translate an axial inwards movement into a lateral outwards movement, the movement of said slide axially inwards moving said at least two balls laterally outwards until they reach said first position in said spindle annular groove; the balls in their first position allowing said stub space to move past them and be withdrawn from said spindle bore.

6. The apparatus of claims 5 further including a diaphragm mounted on said hub and deflectable along said hub central axis, said stub being mounted on said diaphragm;
- a plurality of stops mounted on said hub and said spindle and positioned such that when said hub is mounted on said spindle with said stub in said bore the stops on the hub abut the stops on said spindle;
- the undeflected position of said diaphragm extending said stub into said bore to an extent less than said predetermined extent such that said lower shoulders of said stub are axially outwards from a position which allows said at least two balls to be captured between said lower shoulder and said spindle annular groove's upper shoulder;
- said diaphragm deflectable to move said stub inwards to said predetermined extent to allow said at least two balls to move into said second position between said upper and lower shoulders to thereby lock said disc pack onto said disk drive.

7. The apparatus of claims 5 further including an alignment means comprising
- a locating diaphragm mounted on said hub and deflectale along said hub central axis;
- a locating ball having a central bore through which said stub extends mounted concentric to said hub central axis on said diaphragm;
- an open apex conical bearing surface mounted on the open end of said spindle concentric with the axis of said spindle, the open apex of said conical surface comprising the entrance to the bore of said spindle;
- a plurality of stops mounted on said hub and said spindle;
- said hub, spindle and stops being so disposed and arranged that when said ball is pressed against said conical bearing surface to slightly deflect said locating diaphragm outwards, the stops on said hub contact the stops on said spindle.

8. A hub/spindle connecting mechanism comprising
- a hub having a central bore, said bore having a central axis;
- a restoring force means mounted on said hub and deflectable along the axis of said bore;
- a stub mounted on said restoring force means and extending through said bore, terminating in a open ended hollow portion;
- at least two balls loosely mounted in the walls of said hollow portion, exposed to both the interior and exterior of said stub and movable therebetween a limited distance between retracted and extended positions;
- a spindle adapted for removably mounting said hub thereon;
- said spindle having an interior passageway and an open end adapted to receive said stub, the cross section of which allows receipt thereof only with said balls substantially in their retracted position;
- a push rod movably mounted in said spindle and extending into said passageway; said rod having a cross section broader than the gap between said steel balls in their retracted position and more narrow than the gap between them in their extended position;
- means for biasing said push rod outwards;

an annular groove mounted in said passageway just interior of the rest position of said balls when said hub is abutting against said spindle;

said restoring force means adapted to deflect under pressure a distance sufficient to move said bearings into alignment with said annular groove;

said annular groove adapted to receive said balls in their extended position, said push rod adapted to move between said balls when they move into said extended position, thereby preventing said balls from being retracted from said annular groove and likewise preventing said stub from being withdrawn from said passageway, said restoring force means exerting an outward force on said balls to forcibly hold said hub in abutment with said spindle; and means for withdrawing said push rod from between said balls to release said balls and allow the removal of said hub from said spindle.

9. The mechanism of claim 8 further including means for aligning said hub relative to said spindle.

10. The mechanism of claim 9 wherein said aligning means comprises
a restoring force means mounted on said hub, spanning said bore and deflectable along said axis;
a conical bearing surface mounted on said spindle concentric with said passageway; and
a hemispherical bearing surface mounted on said restoring force means concentric with said axis and having an aperture therethrough, concentric with said axis, through which said stub extends.

11. The mechanism of claim 10 further including a lateral flange concentrically mounted on said spindle and stops mounted on said hub and adapted to abut against said lateral flange.

12. The mechanism of claim 8 wherein the abutting end of said push rod has inclined surfaces adapted to abut against said balls in their retracted position and translate the biasing force from said biasing means into a lateral force against said balls thereby urging them outwards.

13. The mechanism of claim 8 wherein the exteriormost surface of said annular groove connecting to said interior passageway is inclined with repect to a direction inwards along the longitudinal axis of said passageway at an angle less than 90°.

14. A hub/spindle connecting mechanism comprising a disk pack having a central hub;
a restoring force means spanning said central hub;
a stub mounted on said restoring force means and extending along a central axis of said hub; an annular groove disposed adjacent the unattached end thereof;
a disk drive spindle having a central passageway adapted to receive said stub;
an annular groove having an inclined upper shoulder disposed in said passageway;
a slide slideably mounted in said passageway, said slide defining a central bore adapted to receive said stub;
a plurality of balls, loosely mounted in said slide and exposed to both the interior bore and the exterior of said slide;
means for biasing said slide outwards along said passageway;
means for stopping the movement of said disk pack and thereby the movement of said stub into said spindle passageway at a predetermined point when mounting said disk pack on said disk drive;
said restoring force means deflectable to further move said stub into said spindle passageway a distance sufficient to engage said balls and push said slide inwards and said balls laterally outwards into the annular groove disposed in said spindle passageway until the gap between them is such as to allow said stub space to move between them, said biasing means holding said slide member in place against further movement of said stub inwards until said stub annular groove is reached, whereupon the balls move into registration with said stub annular groove; the upper shoulder of the spindle annular groove and the lower shoulder of the stub annular groove acting to capture said balls between them and prevent tire withdrawal of said stub from said passageway.

15. The mechanism of claim 14 further including unlocking means for withdrawing said slide inwards along said passageway to thereby draw said balls out of said stub annular groove and into said spindle annular groove to thereby allow said stub space to withdraw from said passageway.

* * * * *